Feb. 5, 1952 — P. R. SONNEMAN — 2,584,238
DISK HARROW
Filed Dec. 18, 1944 — 2 SHEETS—SHEET 2

Inventor:
Paul R. Sonneman.
By Paul O. Pippel
Atty.

Patented Feb. 5, 1952

2,584,238

UNITED STATES PATENT OFFICE 2,584,238

DISK HARROW

Paul R. Sonneman, Chicago, Ill., assignor to International Harvester Company, a corporation of New Jersey Application December 18, 1944, Serial No. 568,573

3 Claims. (Cl. 55—83)

This invention relates to agricultural implements and particularly to disk harrows and the like. More specifically, the invention concerns a tandem disk harrows adapted to be drawn by a tractor.

An object of the invention is to provide improved connections between the front and rear sections of a tandem disk harrow.

In tandem disk harrows adapted to be drawn by tractors and the like, the rear section is so positioned as to trail, when straightened for transport purposes or the like, at a distance of several feet behind the first section. One of the problems incident to the use of such implements has been that, in backing up, the side draft on the disks of the trailing rear section caused it to move sidewise and render steering thereof very difficult or impossible. Since backing up is done fairly frequently to dislodge trash from the disks and the like, the problem has become one of considerable importance.

Therefore, another object of the invention is to provide means for controlling the rear section of a tandem disk harrow when backing up.

A further object is to provide connecting means between front and rear sections of a tandem disk harrow, whereby the rear section, during backing up, is telescoped with respect to the front section to form a compact, easily steerable unit.

Still another object is to provide as the sole connecting means between front and rear sections, a centrally disposed connecting member serving as a frame and draft member for the rear section, and providing a telescoping connection whereby the front and rear sections may be brought closer together when backing up.

Other objects and advantages will become clear from the following detailed description when read in conjunction with the accompanying drawings, wherein.

Figure 1:
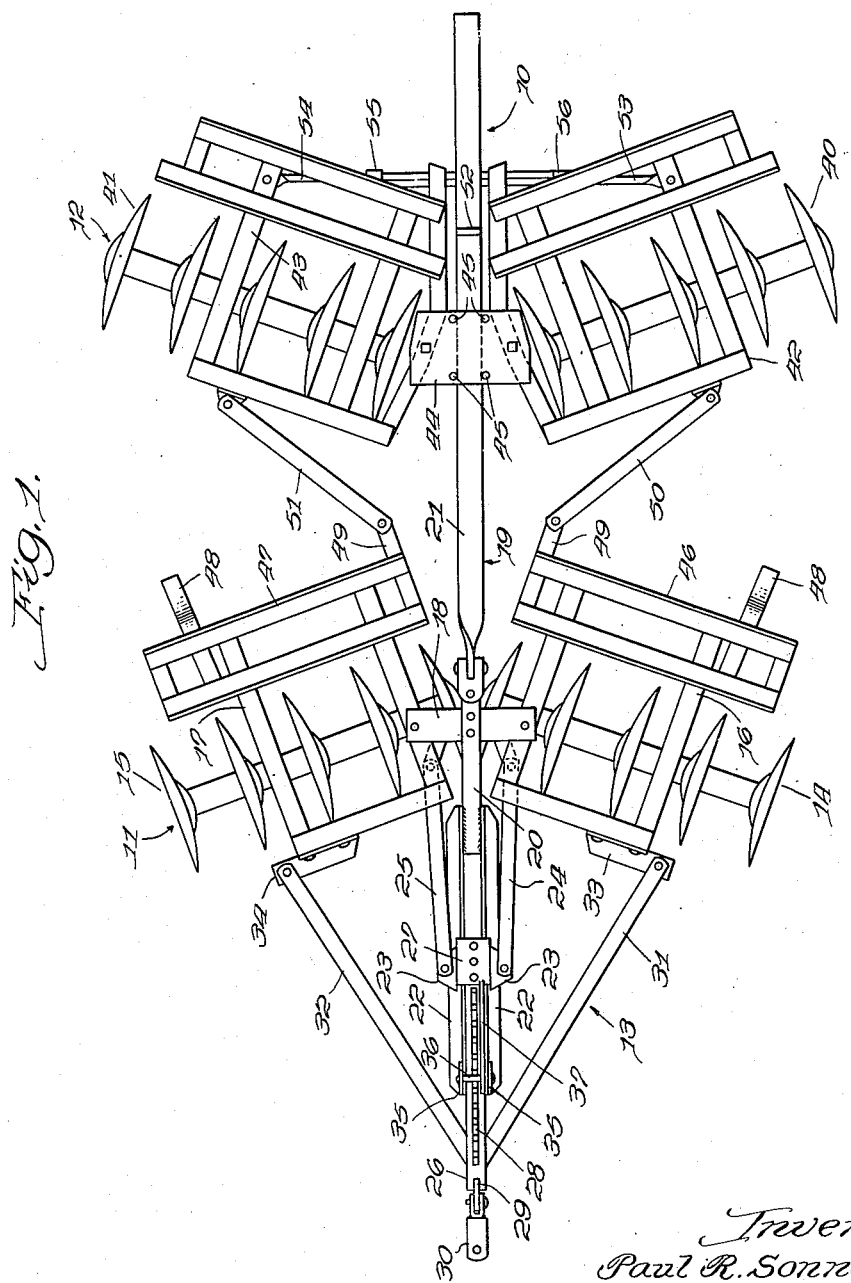
Figure 1 is a plan view of a tandem disk harrow embodying the features of the present invention and showing the disk gangs in operating position.

In the drawings, it will be noted that the tandem disk harrow of the present invention includes a frame 10, a pair of front and rear sections 11 and 12, and a draft structure 13.

Front section 11 comprises a pair of disk gangs 14 and 15 mounted upon frames 16 and 17 respectively. Frames 16 and 17 are pivotally connected at their inner ends to a transverse plate 18 for pivotal movement in a generally horizontal plane whereby gangs 14 and 15 are permitted to occupy positions between that shown in Figure 2, wherein the gangs are in axial alinement and the harrow is in position for transport, and Figure 1 wherein the gangs are at an angle with respect to each other.

Plate 18 is secured to a centrally disposed frame member or center bar generally indicated at 19 and including a forward portion 20, and a rearward portion 21 pivoted to the forward portion for both lateral and vertical movement. The forward part 20 of central frame member 19 has secured thereto laterally spaced angle bars 22 forming a channel therebetween and having secured thereto laterally spaced lugs 23 upon which are pivotally mounted the front ends of a pair of laterally spaced straps 24 and 25. The rearwardly extending ends of straps 24 and 25 are pivotally attached to the inner ends of gangs 14 and 15, respectively, for a purpose which will hereinafter become clear.

The channel between angle bars 22 provides a groove in which is slidable a longitudinally extending member 26 having secured to the rear end thereof vertically spaced plates 27 wider than the member 26 and adapted to ride upon the vertically extending flange portion of angle bar 22. Member 26 is likewise provided on its upper surface with a toothed rack 28 having a function to be hereinafter set forth. At its forward end member 26 is provided with a vertically extending plate 29 which is pivotally connected to a clevis 30 adapted to be attached to the draw-bar of a tractor or the like. To the lower end of member 29 are pivotally attached the front ends of a pair of rearwardly diverging straps 31 and 32, the rear ends of which are pivotally connected to extensions 33 and 34 mounted upon the forward portions of frames 16 and 17, respectively, adjacent the outer ends thereof.

Secured to the forward ends of angle bars 22 are laterally spaced upstanding ears 35 having mounted therebetween a pin 36 upon which is pivoted a bent arm 37, having a pin 38 secured to the bight portion thereof, and having a rope 39 attached to the free end thereof. Arm 37 is rockable upon its pivot 36 by manipulation of rope 39, which extends forwardly to a position accessible to the operator of the vehicle by which the harrow of the present invention is drawn. Rocking movement of the arm 37 to the position shown in Figure 3 places the pin 38 in one of the notches in the rack 28, thus preventing sliding movement of member 26 relative to the bars 22. Upon withdrawal of pin 38 from the rack 28, the member 26, of course, has free sliding movement in the channel formed by the bars 22, the plates 27 serving as a stop to abut against the ears 35 in one direction and a bend in the member 20 in the other direction to limit the longitudinal movement thereof. In the position of the member 26 shown in Figure 2, the member is fully received in the channel formed by the bars 22 and the gangs 14 and 15 are in axial alinement. In this position the arm 37 has been rocked to permit the pin 38 to catch in one of the notches in the rack 28. Upon rocking of the arm 37 to withdraw the pin 38 from its notch, the member 26 is permitted to slide forwardly to a position such as that shown in Figure 1, with the gangs 14 and 15 at an angle with respect to each other and with respect to the harrow frame. This forward movement of the member 26 occurs as a result of the draft force exerted thereupon by the vehicle to which the implement is attached. Upon backing up the vehicle, of course, the member 26 will be retracted and the gangs 14 and 15 will return to the position shown in Figure 2.

The harrow of the present invention is a tandem disk harrow and the rear section 12 is shown as comprising disk gangs 40 and 41 mounted upon frames 42 and 43 similar to the frames 16 and 17. Frames 42 and 43 are pivotally connected at their inner ends to a plate 44 for longitudinal pivotal movement in a generally horizontal plane. Plate 44 is likewise provided with longitudinally spaced pairs of bolts 45 providing therebetween a guideway for the rear center-bar section 21 to serve with the bar 21 as a telescopic connection and permit longitudinal sliding movement of the plate 44 relative to the bar 21.

Figure 2:
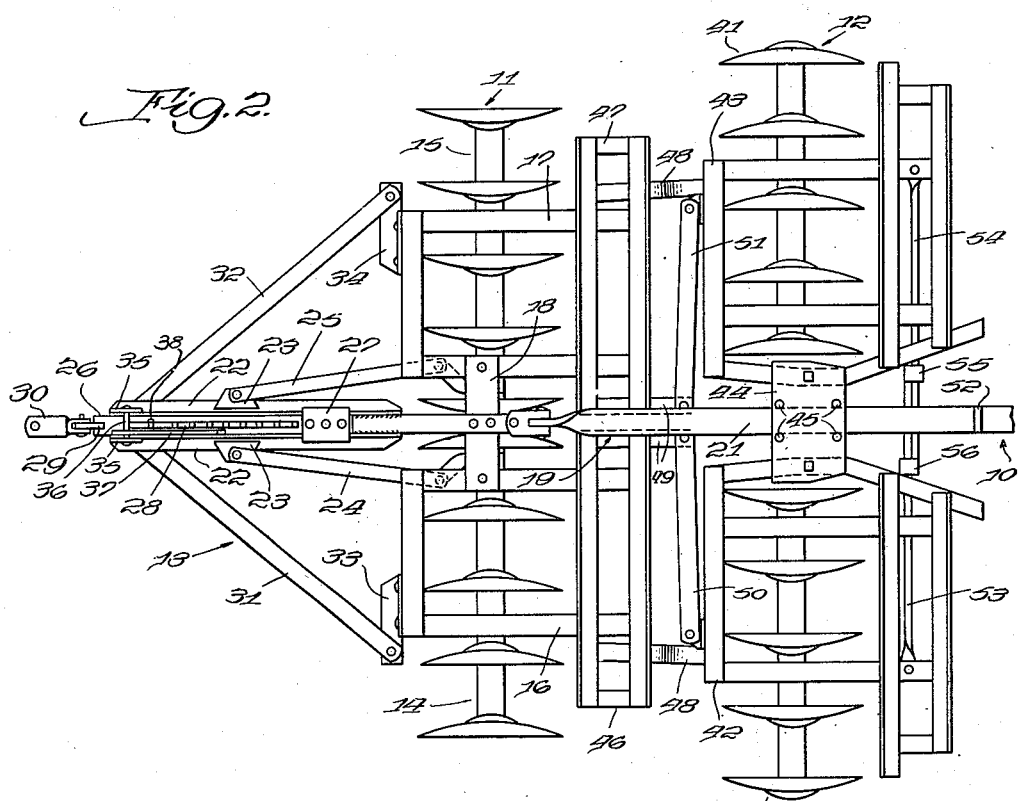
Figure 2 is a plan view similar to Figure 1, showing the disk gangs in transport position and with the front section telescoped rearwardly in juxtaposition with the rear section to facilitate backing up.
Figure 3:
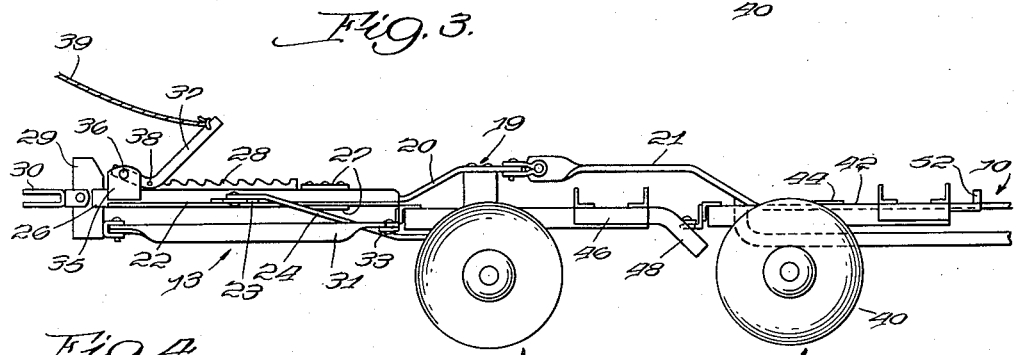
Figure 3 is a side view of the structure shown in Figure 2.
Figure 4:
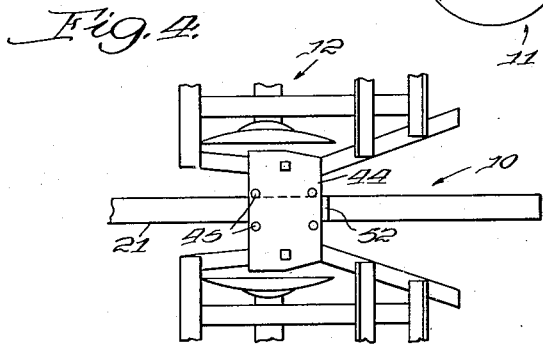
Figure 4 is a detail of a portion of the center bar of the harrow and showing its relationship with the rear section.

Upon the rear portions of frames 16 and 17 are mounted racks 46 and 47, respectively, adapted to hold weights when extra pressure is desired in order to force the disks deeper into the ground or to penetrate hard soil or the like. Adjacent the outer ends of the racks 46 and 47 are rearwardly and downwardly extending bumpers 48 serving a function which will hereinafter be described. The inner ends of racks 46 and 47 are provided with extensions 49 to which are pivotally attached the forward ends of rearwardly and outwardly extending links 50 and 51. The rear ends of links 50 and 51 are pivotally secured respectively to the frames 42 and 43 of the rear section 12. Thus plate 44 is slidable upon the center bar 21, and links 50 and 51, pivotally connected to the front and rear sections 11 and 12, and functioning as draft connections which collapse to permit the front section and the center bar 21 to be moved relatively to the rear section. The collapse of links 50 and 51 causes the front section to telescope to a location in juxtaposition with the rear section, as indicated in Figure 2. In the position shown in Figure 2, the rear gangs 40 and 41 are in alinement with and parallel to the front gangs 14 and 15, and the front and rear sections have telescoped until the frames 42 and 43 are in contact with the bumpers 48 on the front section. This occurs when the implement is backed up. As pointed out before, this frequently occurs in the field during operation of the implement when it is necessary, for example, to dislodge accumulations of trash in the disks. The proximity of the rear section 12 to the front section and the contact thereof with the bumpers 48 permits the rear section to be guided with the front section and avoids the difficulties previously encountered with implements of this type, when side draft upon the rear section tended to interfere seriously with the guiding of the implement. Forward draft upon the implement causes the gangs to again assume positions such as that shown in Figure 1 for operating purposes. Forward movement of member 26 causes the outer ends of gangs 14 and 15 to swing forwardly. Corresponding rearward swinging of the inner ends of these gangs exerts pressure upon the outer ends of gangs 40 and 41 to cause them to swing rearwardly. The gangs may be held in any desired angular position by the operation of the lever 37. The rear section is stabilized by the plate 44, and rearward movement of the plate is limited by a stop comprising a vertical projection 52 on the center bar 21. In Figure 4 the plate 44 is shown in contact with the projection 52, with the rear gangs 40 and 41 in axial alinement. In this position the rear gangs 40 and 41 are at their normal distance from the front gangs 14 and 15 when the tractor is being propelled forwardly in transport position. The central telescoping connection provided by the plate 44 and the central frame bar 19 with the collapse of links 50 and 51 allow the front and rear sections 11 and 12 to be brought bodily together in close association to better control the harrow when backing. The rear section is further stabilized by a pair of telescoping bars 53 and 54, respectively, pivoted at their outer ends upon the frames 42 and 43 and having their inner ends received for sliding movement in sleeves 55 and 56 provided on bars 53 and 54, respectively.

The operation of the tandem disk harrow of the present invention should be clear from the foregoing description. Likewise, it should be understood that the invention has been described in its preferred embodiment, and that modifications may be made therein without departing from the spirit of the invention or the scope of the appended claims.

What is claimed is:

1. In a disk harrow, a pair of transversely extending generally parallel harrow sections in tandem relation, a draft structure attached to the forward section, collapsible draft connections between said sections, a central frame member extending longitudinally between said sections, a connection between said forward section and said frame member, a connecting element slidable longitudinally of said member for connecting the rear section thereto, whereby said rear section may be telescoped with relation to said forward section, bumpers on the rear of said forward section for limiting telescoping movement of said rear section, and a stop on said central frame member engageable with said slidable connecting element only in the transport position of the harrow to transmit draft from the central frame member to the rear section.

2. In a disk harrow, a pair of transversely extending generally parallel harrow sections in tandem relation, a draft structure attached to the forward section, collapsible draft connections between said sections, a central frame member extending longitudinally between said sections, a connection between said forward section and said frame member, a connecting element slidable longitudinally of said member for connecting the rear section thereto, whereby said rear section may be telescoped with relation to said forward section, stop means on said frame member engageable with said slidable connecting element only in the transport position of the harrow to limit the rearward movement of the rear section and transmit draft from the frame member thereto, and laterally spaced rearwardly extending bumpers on said forward section engageable with said rear section for limiting telescoping movement of said rear section in the other direction.

3. In a disk harrow, a pair of harrow sections in tandem relation, each said section comprising a pair of laterally spaced gangs, draft connections between said sections, said connections serving to transmit draft between said sections in the operating position thereof, a central frame member extending longitudinally of said implement, connections between the central portions of said sections and said frame member at longitudinally spaced points thereon, the connection of one said section to said frame member being slidable to provide for longitudinal movement of said section with respect to the other, and a stop on said frame member engageable with the rear harrow section only in the transport position of the harrow to transmit draft to the rear section.

PAUL R. SONNEMAN.

REFERENCES CITED

The following references are of record in the file of this patent:

UNITED STATES PATENTS

| Number | Name | Date |
|---|---|---|
| 1,421,048 | Ward | June 27, 1922 |
| 1,476,512 | Heston | Dec. 4, 1923 |
| 1,489,020 | Smith | Apr. 1, 1924 |
| 1,533,029 | Robinson et al. | Apr. 7, 1925 |
| 1,611,358 | Miller | Dec. 21, 1928 |
| 1,667,392 | Robinson | Apr. 24, 1928 |
| 1,777,512 | Altgelt | Oct. 7, 1930 |
| 1,824,011 | Enzenauer et al. | Sept. 22, 1931 |
| 1,836,227 | Curry et al. | Dec. 15, 1931 |
| 2,113,832 | Everett | Apr. 12, 1938 |
| 2,239,948 | Young | Apr. 29, 1941 |
| 2,255,380 | Curtis | Sept. 9, 1941 |